United States Patent
Gianvito et al.

Patent Number: 5,857,559
Date of Patent: *Jan. 12, 1999

[54] SLIDING BELT TURN CONVEYOR

[75] Inventors: Rodolfo Gianvito, Oakville; John A. Krznarich, Burlington; Allan Ewing, Georgetown, all of Canada

[73] Assignee: Mannesmann Dematic Rapistan Corp., Grand Rapids, Mich.

[*] Notice: The term of this patent shall not extend beyond the expiration date of Pat. No. 5,722,531.

[21] Appl. No.: 704,948

[22] Filed: Aug. 29, 1996

Related U.S. Application Data

[63] Continuation-in-part of Ser. No. 600,593, Feb. 13, 1996, Pat. No. 5,722,531.

[51] Int. Cl.[6] .......................... B65G 15/02; B65G 21/16
[52] U.S. Cl. ......................... 198/831; 198/835; 198/838; 198/841
[58] Field of Search .................... 198/831, 835, 198/838, 841

[56] References Cited

U.S. PATENT DOCUMENTS

| | | | |
|---|---|---|---|
| 735,722 | 8/1903 | Dennis . | |
| 1,578,303 | 3/1926 | Walter et al. . | |
| 1,698,786 | 1/1929 | Finn . | |
| 1,972,753 | 9/1934 | Bausman | 198/25 |
| 2,320,667 | 6/1943 | Smith | 198/233 |
| 2,619,222 | 11/1952 | Przybylski | 198/202 |
| 2,725,757 | 12/1955 | Murphy | 74/240 |
| 3,214,007 | 10/1965 | Matthies et al. | 198/195 |
| 3,217,861 | 11/1965 | Daniluk et al. | 198/182 |
| 3,237,754 | 3/1966 | Freitag, Jr. et al. | 198/182 |
| 3,661,244 | 5/1972 | Koyama | 198/184 |
| 3,901,379 | 8/1975 | Bruhm | 198/182 |
| 3,951,256 | 4/1976 | Gurewitz | 198/182 |
| 4,203,512 | 5/1980 | Ammeraal | 198/594 |
| 4,724,953 | 2/1988 | Winchester | 198/836 |
| 4,846,338 | 7/1989 | Widmer | 198/831 |
| 4,955,466 | 9/1990 | Almes et al. | 198/831 |
| 5,332,082 | 7/1994 | Sommerfield | 198/831 |
| 5,360,102 | 11/1994 | Schöning | 198/831 |

FOREIGN PATENT DOCUMENTS

| | | |
|---|---|---|
| 464877A | 1/1992 | European Pat. Off. . |
| 2365502 | 9/1977 | France . |
| 4113051 | 4/1995 | Germany . |
| 8702617 | 11/1987 | Netherlands . |
| 8700592 | 10/1988 | Netherlands . |
| 8700593 | 10/1988 | Netherlands . |
| 4020226 | 1/1992 | United Kingdom . |
| WO9427895 | 12/1996 | WIPO . |

*Primary Examiner*—Karen M. Young
*Assistant Examiner*—Thuy V. Tran
*Attorney, Agent, or Firm*—Van Dyke, Gardner, Linn & Burkhart, LLP

[57] ABSTRACT

A belt turn conveyor includes a conveyor support having first and second generally stationary vertical bearing surfaces and first and second generally stationary horizontal bearing surfaces. An endless belt is rotationally supported by the conveyor support and includes bearing assemblies for engaging the vertical bearing surfaces for retaining the endless belt on the conveyor support. An elongated strip of low friction flexible material is secured to the endless belt for engaging the horizontal surfaces of the conveyor support to restrain vertical movement of the endless belt.

52 Claims, 7 Drawing Sheets

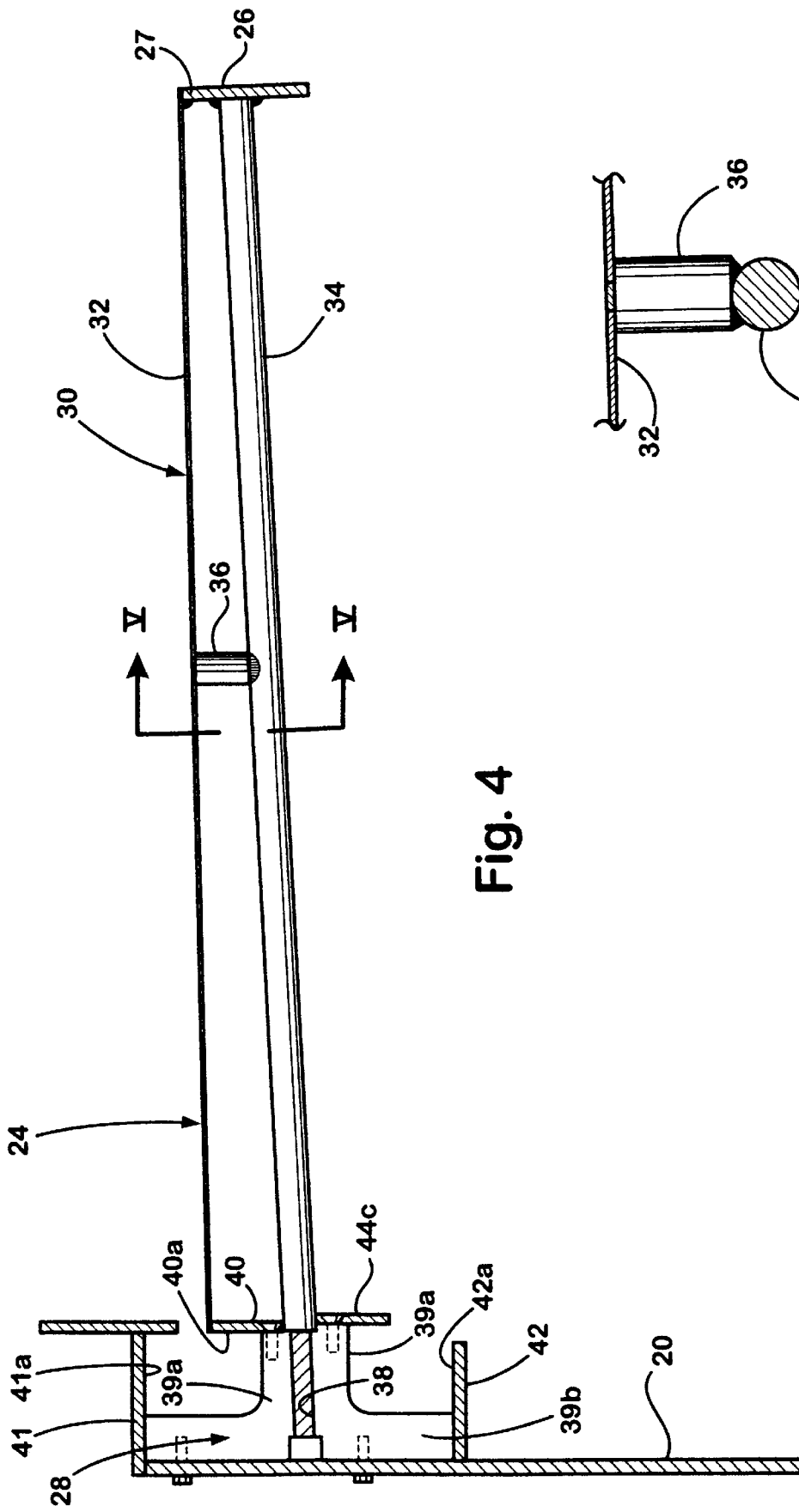

SLIDING BELT TURN CONVEYOR

This is a continuation in part of U.S. patent application for BELT TURN CONVEYOR, filed on Feb. 13, 1996, Ser. No. 08/600,593 now U.S. Pat. No. 5,722,531 which is incorporated herein by reference in its entirety.

BACKGROUND OF THE INVENTION

This invention relates generally to a transporting apparatus and, more particularly, to belt turn conveyors, which extend around a curve.

Belt turn conveyors are capable of interconnecting generally straight conveyor sections and provide a turn of up to 180°. Such turn conveyors conventionally includes a pair of conical shaped pulleys, one at each end, and a continuous belt having a smaller length at the inner radius of the turn and a longer length toward the outer radius of the turn. The pulleys and belt are supported by a frame. A conveyor frame typically includes radially spaced legs and horizontal members connecting the legs, which provide a planar support surface for the upper portion of the belt. In operation, especially when the belt is laden with packages or articles to be transported, the belt experiences radial forces, which tend to pull the belt off the pulleys inward of the frame and to cause the belt to ride up against the support frame. Means are provided to retain the belt on the turn conveyor.

In U.S. Pat. No. 4,955,466 to Almes et al., the conveyor belt is provided with an enlarged distal edge (3), which is captured between upper and lower rollers. The rollers are angled so that they bear on an inner, downwardly sloping side of the enlarged edge of the belt and make a line contact with the enlarged edge. Under high speeds of operation, the enlarged edge (3) may tend to distort and flatten so that the belt is not adequately restrained in the vertical direction.

In U.S. Pat. No. 5,332,082 to Sommerfield, a conveyor turn is disclosed which includes a plurality of roller assemblies that are secured to the belt and engage a guide surface provided by a slotted guide rail (31). The vertical movement of the belt is not restrained at its upper portion; instead, the belt is free to lift off the horizontal support member (32) until it makes contact with the free edge of the slotted guide rail. The belt may be subject to increased wear and may experience a shortened operational life.

To overcome the problem of the belt lifting off its support, some conveyors have employed two sets of wheels, one set restrains the belt from sliding off the support and the other set restrains the belt from lifting off the support. For example, in German Document Patent No. DE 41 13 051 C2 discloses two sets of wheel assemblies. However, the supporting structure, which provided the guide rails for the wheels is complicated and generally increases the overall height of the turn conveyor. Furthermore, the spacing between the turn conveyor and the adjacent straight conveyor section is increased in order to accommodate the wheels assemblies and the wheel guide tracks. When the space between the adjacent conveyor sections is increased, smaller packages may fall between the adjacent conveyor sections or may get caught between he sections. Moreover, with the increase in number of wheel assemblies there is a significant increase in noise.

Known belt turn conveyors also tend to have a poor utilization rate because maintenance is difficult and time-consuming when required. This is especially the case with replacement of the belt which has required disassembly of virtually the entire conveyor section. Additionally, difficult alignment procedures have added to the downtime of the conveyor undergoing maintenance or installation.

Therefore, there is a need for a belt turn conveyor which provides means for restraining the belt from lifting off the conveyor support while minimizing the space between adjacent belt conveyor sections and the overall height of the belt turn conveyor and which will reduce the noise of the conveyor when the belt run conveyor is operation. Furthermore, there is a need for a belt that is relatively easy to install and replace.

SUMMARY OF THE INVENTION

The present invention provides a belt turn conveyor that is exceptionally quiet, includes reduced spacing requirements between adjacent conveyor sections, and is easy to maintain. Furthermore, the endless belt is lighter and easier to handle. The replacement of the belt is a quick and simple procedure requiring disassembly of, at most, only minor portions of the conveyor.

According to one aspect of the present invention, a belt turn conveyor includes a conveyor support having first and second generally stationary vertical bearing surfaces and first and second generally stationary horizontal bearing surfaces. An endless belt is rotationally supported by the conveyor support. The endless belt includes means for engaging the vertical bearing surfaces for retaining the endless belt on the conveyor support. An elongated strip of low frictional flexible material is secured to the endless belt for engaging the horizontal surfaces to restrain vertical movement of the endless belt.

The elongated strip of low frictional flexible material may comprise a needle point material and is secured to an upper surface of the belt. In other aspects, the means for retaining the belt on the conveyor support on the curved path of the belt turn conveyor comprises wheel assemblies. In further aspects, the conveyor support includes a bracket, which provides the vertical and horizontal bearing surfaces. A support beam is cantilevered from the bracket for supporting the endless belt thereon. In one aspect, the bracket is T-shaped having an upper and lower flange portions and a central web portion. A bearing member is secured to the central web portion, which extends above and below the central web portion to provide the vertical bearing surfaces.

According to another aspect, an endless belt assembly for a belt turn conveyor is disclosed which includes a conical shaped endless belt having an inner edge dimension and an outer edge dimension. The inner edge dimension is less than the outer edge dimension. A plurality of spaced bearing assemblies are secured to the endless belt for retaining the endless belt on a conveyor support. The bearing assemblies may include rollers for engaging a generally vertical bearing surface of the conveyor support. An elongated strip of low friction flexible material is secured to the endless belt for engaging upper and lower horizontal bearing surfaces of the conveyor support.

According to another aspect, a belt turn conveyor includes a bracket adapted for securing to a vertical support and a belt support surface supported by the bracket. An endless belt rides on the support surface. The belt turn conveyor further includes first, second, and third bearing plates secured to the bracket. To retain the endless belt on a curved path of the belt turn conveyor, a plurality of bearing devices are provided which are mounted to the endless belt, with a first set of bearing devices positioned to engage the first plate. At least one the bearing devices comprises an elongated strip of low friction flexible material secured to the endless belt to engage the second and third plates for restraining the vertical movement of the belt.

According to another aspect of the invention, a support beam is supported from a conveyor support by a T-shaped bracket, which includes upper and lower generally vertically oriented bearing surfaces and upper and lower generally horizontally oriented bearing surfaces. A support beam is support from the bracket. An endless belt includes an upper portion riding over the support beam and a lower portion riding under the support beam. A plurality of bearing assemblies are mounted to a proximate edge portion of the endless belt for engaging the upper and lower generally vertical bearing surfaces to retain the endless belt on the conveyor. At least one bearing device is mounted to the proximate edge portion of the endless belt engaging the upper and lower generally horizontal bearing surfaces to resist vertical movement of the endless belt.

In one aspect, the bearing assemblies comprise wheel assemblies. The wheel assemblies may include wheels with polymeric tires. In other aspects, the bearing device comprises an elongated strip of low friction flexible material. In this manner the endless belt is frictionally restrained from raising off the support beam. In yet another aspect, the elongated strip of low friction flexible material comprises a needle point belting.

These and other objects, advantages, and features of this invention will become apparent upon review of the following specification in conjunction with the drawings.

BRIEF DESCRIPTION OF THE DRAWINGS

FIG. 4 is the same view as FIG. 3 with the belt removed;

FIG. 5 is a sectional view taken along the lines V—V in FIG. 4;

DESCRIPTION OF THE PREFERRED EMBODIMENT

Figure 1:
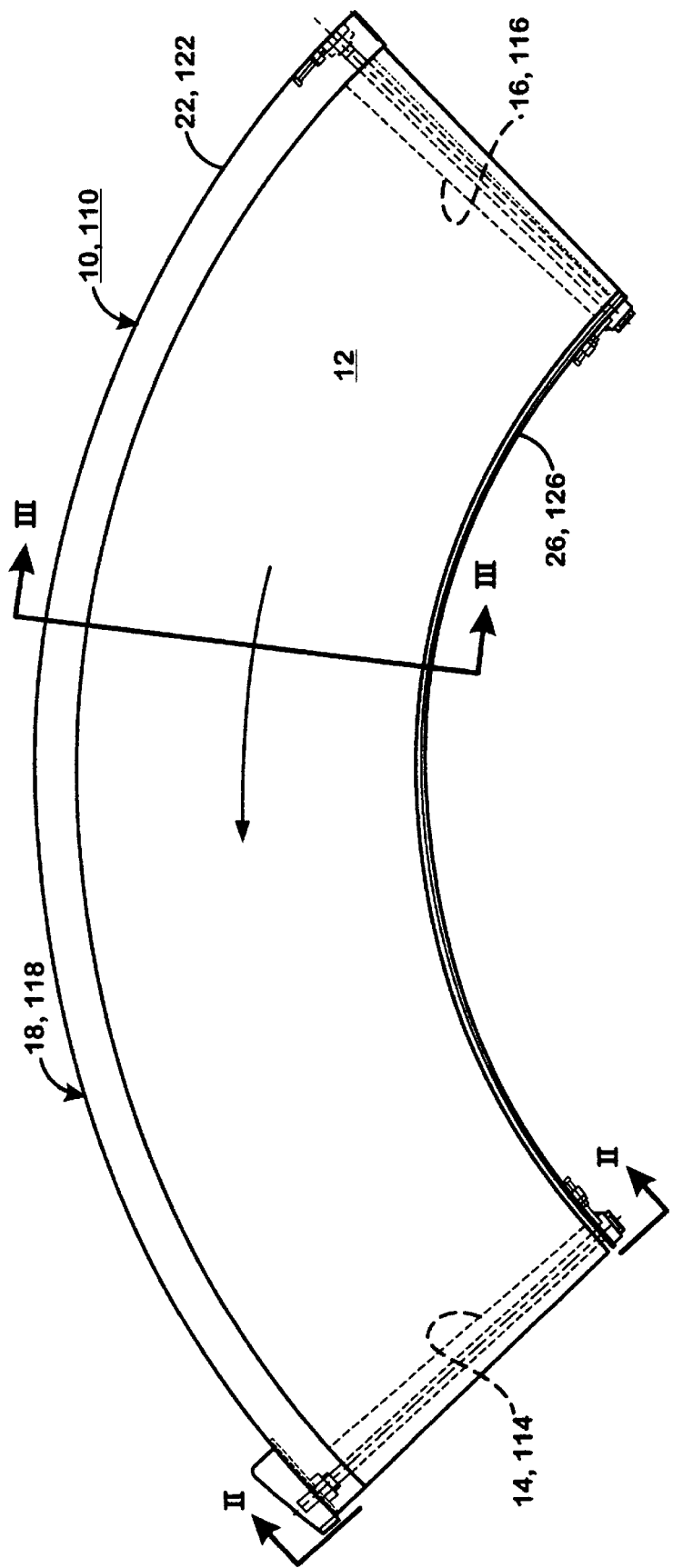
FIG. 1 is a top plan view of a belt turn conveyor, according to the invention.

Referring now specifically to the drawings and the illustrative embodiments depicted therein, a belt turn conveyor 10 includes an endless belt 12 driven by a driven pulley 14 and an idler pulley 16 (FIG. 1). As is conventional, endless belt 12 has a shorter inner length at an inner conveyor end 26 than an outer length at an outer conveyor end 22. Endless belt 12 is preferably a single piece of belt material formed into a ring-shape. Endless belt 12 may comprise a single belt connected at its ends by belt-splicing devices, such as fasteners or mechanical lacing or the like. Furthermore, endless belt 12 may also comprise several sector-shaped pieces joined at the respective ends by belt splicing devices. Pulleys 14, 16 are tapered to frictionally engage the endless belt 12 over its full width so that endless belt 12, which is stretched between the two pulleys 14 and 16, may be driven by pulley 14. Belt 12 and pulleys 14, 16 are supported by a support frame 18.

Support frame 18 includes a vertical support 20 at outer end 22 of the belt turn and a support beam 24 which is cantilevered from vertical support 20. Reference is made to a cantilevered support beam 24, but it should be understood that the cantilevered support beam is preferred when endless belt comprises a single piece of belt material that is formed into a ring since the belt can only be removed if the endless belt is slid off the support beam. In most other endless belt applications in which the endless belt includes belt splicing devices, a cantilevered support beam or a simply supported support beam may be used, for example a beam that is supported at both ends, since the endless belt may be removed by releasing the belt splicing devices. In this embodiment, however, support beam 24 comprises a cantilevered beam and, as such, belt 12 may be removed by sliding the belt toward the free end of support beam 24, to the right as viewed in FIGS. 2–4.

Cantilever support beam 24 is mounted to vertical support 20 by a plurality of support brackets 28 which are spaced along the outer perimeter of the bend turn conveyor 10. The details of the support beam 24 are disclosed in commonly owned pending application Ser. No. 08/600,593 filed Feb. 13, 1996 by John Krznarich for a BELT TURN CONVEYOR, the disclosure of which is incorporated herein by reference and will not be repeated. Suffice to say that support beam 24 may comprise a truss member 30 (FIGS. 4–5). Truss member 30 is made up of a planar support member 32 which extends under substantially the entire upper surface of endless belt 12. Truss 30 additionally includes a plurality of elongated members 34, which in the illustrated embodiment are steel rods but may also comprise angle iron and other structured shapes, which are spaced below planar surface 32 and are interconnected with the planar surface 32 by struts 36. One end of each strut 36 is welded to an elongated member 34 and the other end to planar support 32 (FIG. 5) at the other end. Ends of planar support 32 and each steel rod 34 opposite support bracket 28 are welded to plate 27 at inner conveyor end 26. Each steel rod 34 is additionally rigidly affixed to a respective support bracket 28 by a fastener (not shown) extending through an opening 38 in bracket 28. Planar support 32 is rigidly attached to brackets 28 through a mounting plate 40, which extends the full length of the bend turn conveyor. As will be apparent to those skilled in the art, the rigid interconnection of elongated members 34 and planar support 32 at support brackets 28 at one end and to plate 27 at the opposite end, in combination with a rigid interconnection at strut 36, provides a rigid truss which is capable of supporting a substantial vertical load and thereby is capable of providing cantilever support to endless belt 12 even at inner end 26. Additional rigidity could be provided by using more than one strut 36 for each steel rod 34. Planar belt support surface 32 may be supported by any means including a conventional frame which is not cantilevered or the like.

Each support bracket 28 includes a central web portion 39a and a flange portion 39b which provides cantilevered support for truss 30. A first bearing member is provide by mounting plate 40, which is secured to the distal end portion of web portion 39a. First bearing member 40 includes upper and lower generally vertically oriented bearing surfaces 40a and 40b. Upper and lower bearing surfaces 40a and 40b provide upper and lower vertical wheel guides that extend the entire length of outer end 22 of support frame 18. A second and third bearing members 41 and 42 extend over and are secured to the upper and lower ends of each flange portion 39b, respectively, which include upper and lower generally horizontally oriented bearing surfaces 41a and 42a that project horizontally from the upper and lower ends of the bracket flange portions 39b. Upper and lower horizontal bearing surfaces 41a and 42a provide upper and lower horizontal wheel guides that extend the entire length of outer end 22 of support frame 18.

To retain the endless belt 12 in the curved path of the belt turn conveyor 10, first and second wheel assemblies 46 and 47 are provided and are attached at even spacing along the proximate edge portion of endless belt 12. Each first wheel assembly 46 includes a wheel 54 which is secured to the proximate edge portion of the endless belt 12 by a shaft 55, which extends generally perpendicular from a lower surface 12a of the endless belt and is secured thereto by fasteners (not shown). Wheels 54 engage the upper and lower vertical wheel guides 40a and 40b as the endless belt 12 is moved along the curved path of the belt turn conveyor 10. As can be understood from the drawings, the wheels 54 attached to the portion of the endless belt which is riding across the top side of the truss engage the upper vertical wheel guide 40a, while the wheels attached to the portion riding along the lower side of the truss 30 engage the lower vertical wheel guide 40b.

Figure 6:
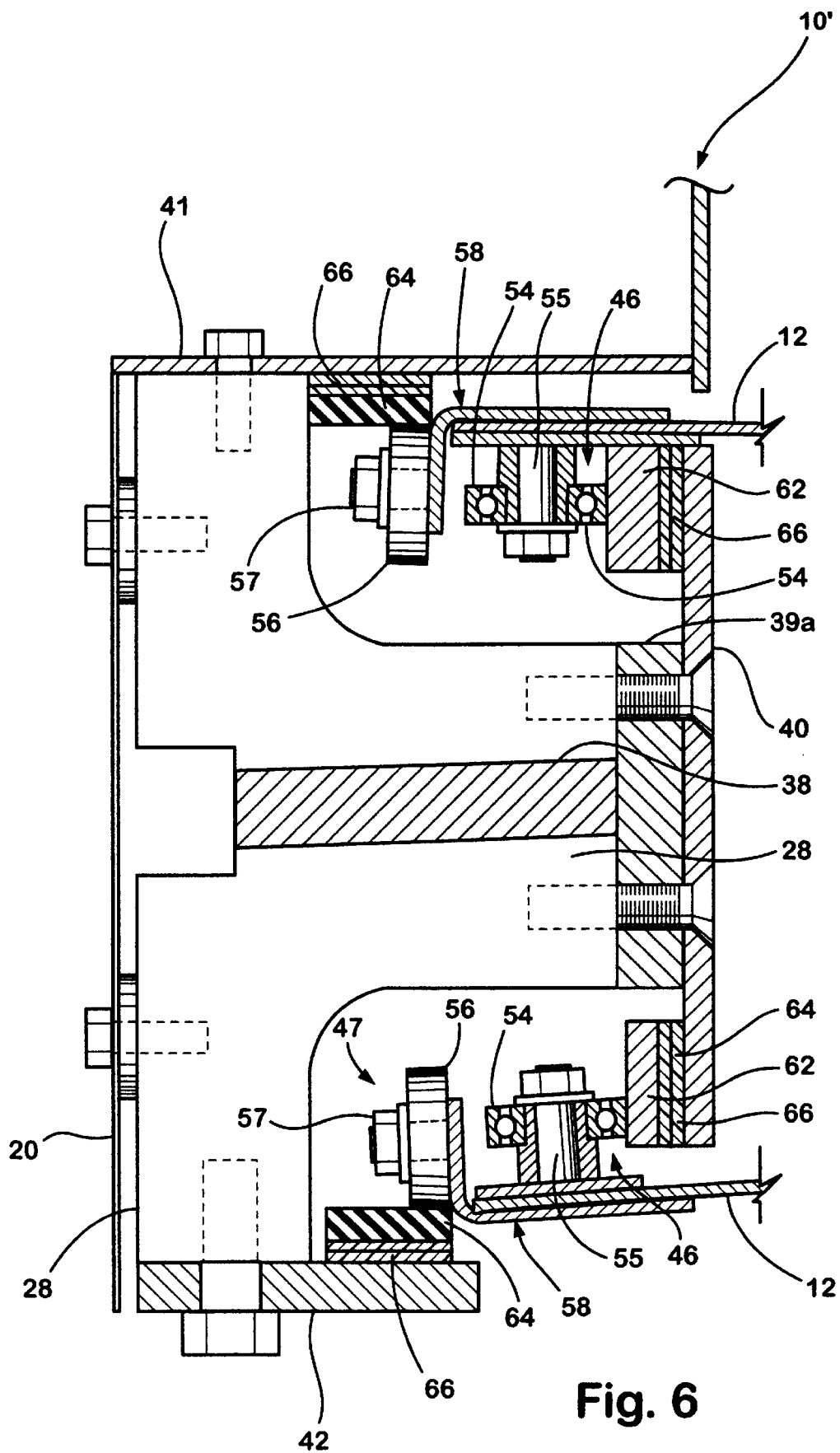
FIG. 6 is an enlarged view similar to FIG. 3 illustrating a radial support for the belt.

Each second wheel assembly 47 includes a wheel 56 supported and journaled on a shaft 57, which in turn is supported by an L-shaped mounting bracket 58. Mounting bracket 58 is secured to a top surface 12b of endless belt 12 by a fastener (not shown) and is arranged to position wheel 56 in a generally vertical orientation, as best seen in FIG. 6, to engage upper and lower horizontal wheel guides 41a and 42a. In the same manner to wheels 54, the wheels 56 attached to the portion of the endless belt which is riding across the top side of the truss 30 engage the upper horizontal wheel guide 41a, while the wheels attached to the portion riding along the lower side of the truss 30 engage the lower horizontal wheel guide 42a.

Liner surfaces 62 are provided along the bearing surfaces 40a and 40b of first bearing member 40 and are, preferably, releasably attached to the first bearing member 40. Similarly, liners 64 are provided along the bearing surface 41a and 42a of second and third bearing members 41 and 42. In the illustrated embodiment, wheels 54 and 56 include outer tires made from a plastic or polymeric material such as urethane and liners 62 and 64 are made from a metal, such as steel. Alternatively, when polymeric material tires are used, liners 62 and 64 may be omitted, as the first, second, and third bearing members are preferably metal, such as steel. This plastic-to-metal interface reduces noise. Conversely, wheels 54 and 56 may have outer tires made from a metal, such as steel, and liners 62 and 64 may be manufactured from a plastic or polymer, such as urethane. This also provides a plastic-to-metal interface which reduces noise.

Liners 62, 64 are preferably replaceable. Liners 62, 64 are mounted to their respective members 40, 41, and 42 by a hook and loop fabric fasteners 66, such as the type marketed under the brand Velcro®. This allows for rapid replacement of liners 62, 64.

Figure 2:
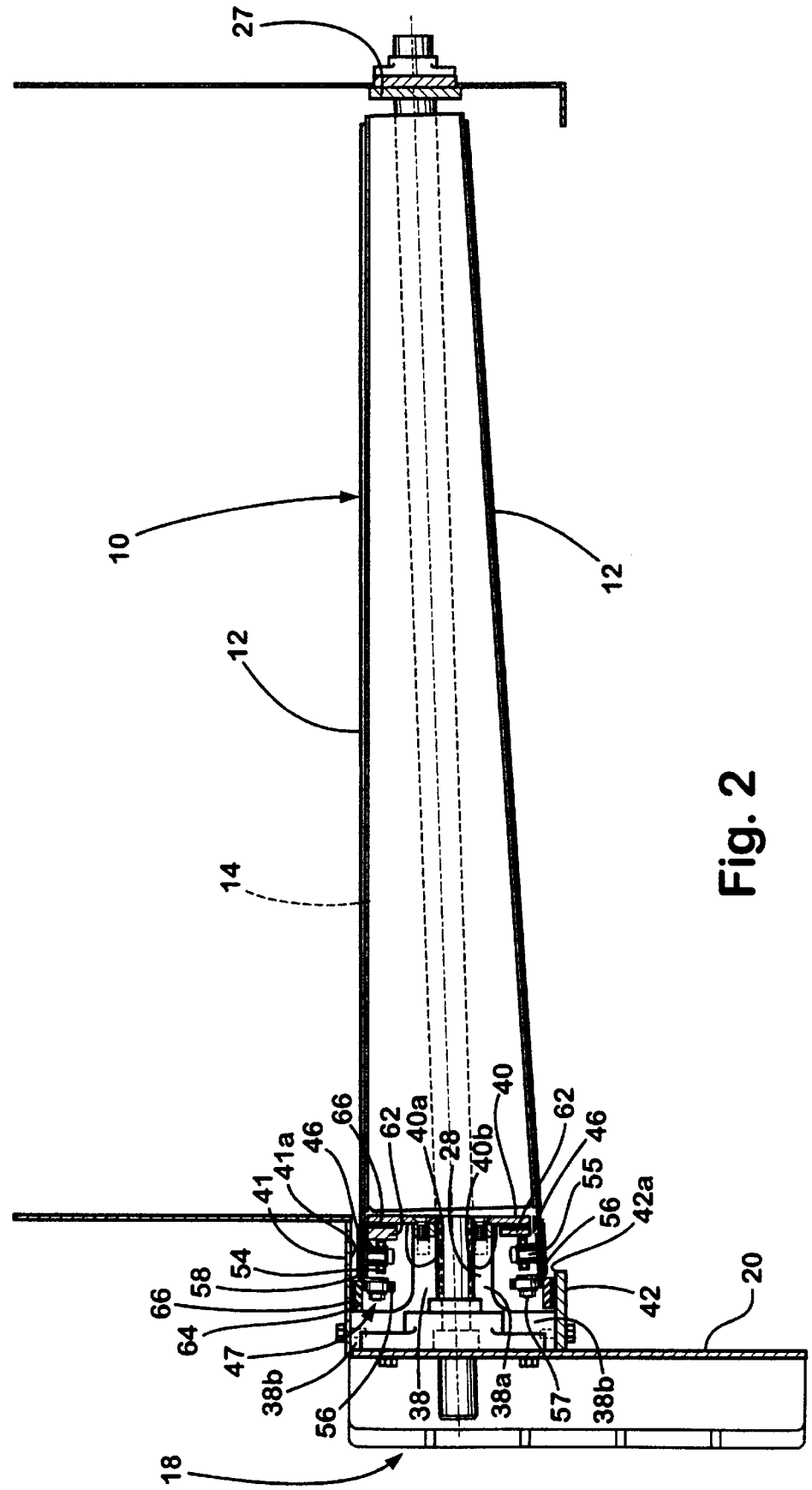
FIG. 2 is an end elevation in the direction II—II in FIG. 1.
Figure 3:
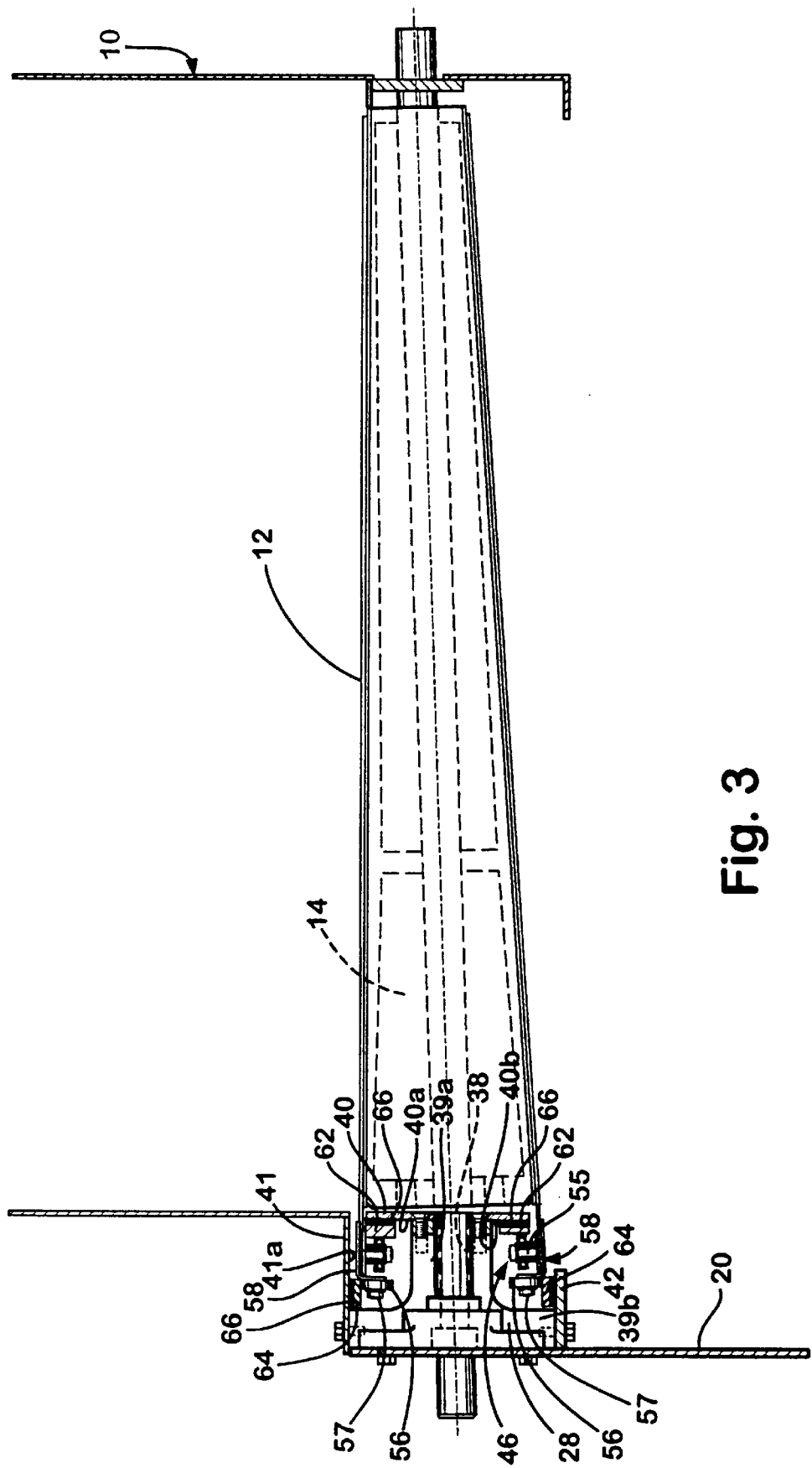
FIG. 3 is a sectional view taken along the lines III—III in FIG. 1.

In order to replace belt 12, a single member, plate 40, is removed, which allows the wheel assemblies 46 and 47 to be separated from the support brackets 28 so that the belt 12 may be slid to the right as viewed in FIGS. 2–4 and thereby removed from the belt turn conveyor for replacement. The same procedure is followed in reverse in order to apply a new belt to the assembly.

Figure 7:
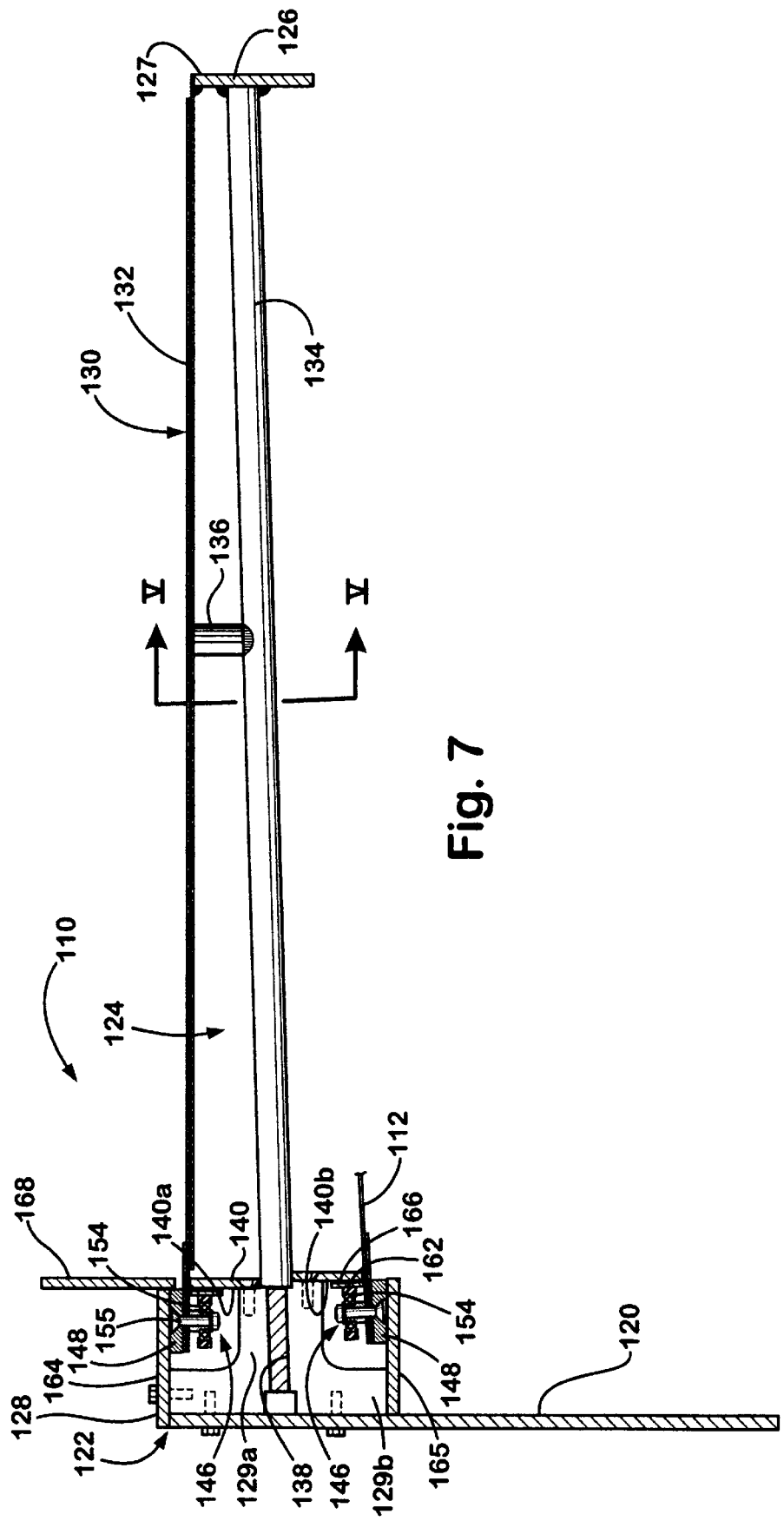
FIG. 7 is the same view as FIG. 3 illustrating an alternative embodiment of the radial support for the belt.
Figure 8:
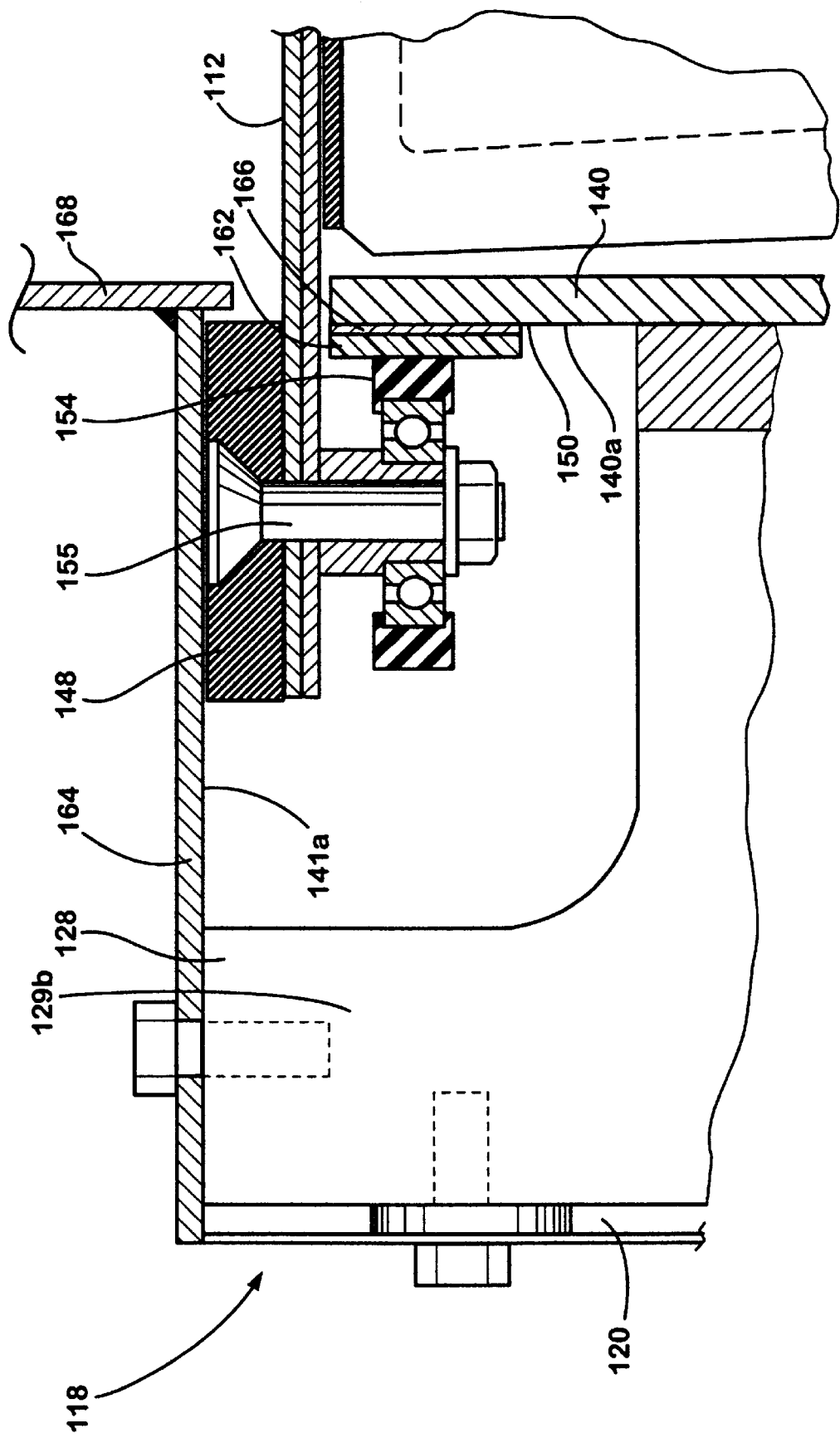
FIG. 8 is an enlarged view similar to FIG. 3 of illustrating an alternate embodiment of the radial support for the belt.

Referring now to FIGS. 7 and 8 of the drawings, another alternative embodiment of a belt turn conveyor 110 is illustrated. Belt turn conveyor 110 includes an endless belt 112 which is stretched between a driven pulley 114 and an idler pulley 116. Endless belt 112 has a generally conical shape with a shorter inner length at an inner conveyor end 126 than an outer length at outer conveyer end 122. Pulleys 114 and 116 have a generally conical shape with tapered outer surfaces to frictionally engage the endless belt 112 over its full width so that endless belt 112, which is stretched between the two pulleys, can be driven by driven pulley 114. To insure that the belt 112 cannot slide off the rollers 114 and 116 while the conveyor is in operation, the longitudinal proximate edge portion of the endless belt 112 is retained by bearing assemblies 146 and a bearing device 148, as will be described more fully.

Endless belt 112 and pulleys 114, 116 are supported by a support frame 118. Support frame 118 includes a vertical support 120 at an outer end 122 of the belt turn conveyor 110 and a cantilevered support beam 124 extending from the vertical support 120 for supporting the endless belt 112 and pulleys 114, 116. Preferably, cantilever support beam 124 is secured to vertical support 120 by a plurality of spaced support brackets 128.

As best seen in FIG. 7, each support bracket 128 comprises a T-shaped bracket having a central web portion 129a and a flange portion 129b. Flange portion 129b is bolted or otherwise rigidly secured to vertical support 120 by fasteners (not shown). Web portion 129a includes a central opening 138 through which a fastener (not shown) extends to mount support beam 124 to support bracket 128.

Support beam 124 is preferably a composite truss beam member 130 cantilevered from support bracket 128. Again, as discussed in reference to the previous embodiments, support beam 124 may also comprise a simply supported beam when endless belt 112 includes belt splicing devices since the belt 112 can be removed by releasing the splicing devices. Truss beam member 130 is of similar construction to truss 30 of the previous embodiment and includes a planar member 132 and a plurality of spaced elongated members 134, which are preferably steel rods. The planar support member 132 is vertically spaced apart from the elongated members 134 but is fixed to the elongated members 134 by a plurality of vertically oriented struts 136, which are positioned at discrete points along a central line extending along the curved path of the bend turn conveyor 110. Struts 136 are each welded at one end to a respective elongated member 134 and welded at their other end to planar support member 132 and are located generally in the middle of the truss beam's span along the central line extending along the path of the endless belt 112. The proximate end of each respective elongated member 134 is mounted adjacent opening 138 of bracket 128 so that a respective fastener (not shown), which extends through opening 138, secures the elongated member 134 of the truss 130 to the bracket 128. Planar support 132 is rigidly secured to bracket 128 by a mounting plate 140, which is welded or otherwise rigidly secured to the distal end of web portion of bracket 128 and to the longitudinal edge portion of planar support 132. Mounting plate 140 also provides upper and lower generally vertically oriented bearing surfaces for wheel assemblies 146, as will be more fully explained. The respective distal ends of elongated members 134 and with the longitudinal distal edge of the planar member 132 are welded to an end plate 127 at the inner end 126 of the bend turn conveyor 110. Additional truss beam member rigidity may be provided by increasing the number of struts 136 interconnecting the planar member 132 to the elongated members 134.

To ensure that endless belt 112 cannot slide off truss beam member 130, endless belt 112 is provided with a plurality of bearing assemblies 146 and 148. The bearing assemblies 146 are preferably roller/wheel assemblies which are mounted on the proximate edge portions of the endless belt 112. Wheel assemblies 146 preferably include wheels 154 with tires made from a polymeric material such as urethane and are mounted on endless belt 112 by shafts 155. As best seen in FIG. 8, shafts 155 are secured to endless belt 112 by fasteners (not shown) and are mounted to extend from an underside of endless belt 112 generally at right angles to the belt 112 so that the wheels 154 have an axis of rotation parallel to the underside surface of the endless belt and engage upper and lower portions of the rearward side 140a of mounting plate 140. As described previously, mounting plate 140 is secured to the distal end of web portion 129a and projects above and below web portion 129a to provide upper and lower generally vertically oriented wheel bearing surfaces 150 that extend the entire length of outer end of support frame 118.

Upper and lower bearing surfaces 150 may be provided with removable liners 162 that are releasably secured to the upper and lower portions of rearward surface 140a of mounting plate 140 by hook and loop fasteners 166, such as VELCRO®. Liners 162 provide a running surface for wheel assemblies 146 and are preferred when wheel assemblies 146 includes metal rollers or tires. In the illustrated embodiment, wheels 154 include outer tires made from a plastic or polymeric material such as urethane. In this case, liners 162 are optional and are preferably made from a metal, such as steel. This plastic-to-metal interface reduces noise. Conversely, as described above, wheels 154 may have outer tires or rollers made from a metal, such as steel. Liners 162 may be manufactured from a plastic or polymer, such as urethane to provide a plastic-to-metal interface, which reduces noise. In this manner, wheels 154 engage liners 162, which restrain lateral movement of endless belt 112 and retain the endless belt 112 in the curved path of the bend turn assembly 110 where liners 162 are not required, as in the case of the wheels with polymeric tires, wheels 154 engage upper and lower surfaces 150 of mounting plate 140, which is preferably metal.

Bearing assembly 148 comprises an elongated strip of low friction, flexible material. Preferably, the elongated strip 148 is a needlepoint fabric and, most preferably, a NPF 60 belt available from Leder Belt of Germany. Elongated strip 148 is secured to a top surface and proximate edge portion of endless belt 112 by an adhesive, which is preferably provided by Leder Belt. As best illustrated in FIGS. 7 and 8, elongated strip 148 may include a plurality of spaced countersunk holes to accommodate the mounting of the wheel assembly shafts 155, which are secured to the endless belt by fasteners that extend through the top surface of the endless belt 112 and into the shafts 155. To restrain the endless belt 112 from raising off the truss beam member 130, elongated strip 148 is sandwiched between endless belt 112, which is supported on truss beam member 130, and the generally horizontally oriented bearing surfaces of first and second bearing plate members 164 and 165. Bearing plate member 164 is rigidly secured to an upper end of flange portion 129b of bracket 128 by a fastener or other suitable securement means and extends over the proximate edge portion of endless belt 112 and to an outside guard member 168. Similarly, bearing plate member 165 is secured to a lower end of flange portion 129b of bracket 128 by a fastener or other suitable securement means and extends over the proximate edge portion of endless belt 112. Bearing plates 164 and 165 provide top and bottom rails for the bend turn conveyor 110 and may be a hot or cold rolled carbon steel, stainless steel, or chromium plate. Furthermore, bearing plates 164 and 165 may have a ceramic surface or TEFLON ® surface to reduce the heat that may develop between the elongated strip and the bearing plates.

It has been found that endless belt 112 is well suited for a wide range of speeds. In the 250–300 FPM (Foot Per Minute) range, elongated strip 148 on endless belt 112 engages the planar surfaces of bearing plates 164 and 165. However, at speeds generally above 300 FPM, the planar surfaces of the bearing plates 164 and 165 may include a plurality of relief rollers/wheels (not shown) to reduce the friction even further and, therefore, reduce the heat that is typically generated at these higher speeds.

Elongated strip 148 restrains the upward vertical movement of endless belt 112 and, therefore, eliminates the need for the second set of wheel assemblies provided in the previous embodiment. It has been found that the elongated strip 148 provides a significant reduction in the noise level of the belt turn conveyor 110 and, furthermore, maintains the smaller profile of the belt turn conveyor 110 that is achieved with the previous embodiment. Moreover, the replacement of the endless belt 112 is made even more simple as the number of the wheel assemblies on the endless belt 12 is reduced by a half. In general, the endless belt is lighter and easier to install.

Although the invention is described as it pertains to a belt turn conveyor, it may be applied to other belt conveyors including straight sections of belt transport conveyors and belt accumulation conveyors.

Changes and modifications in the specifically described embodiments can be carried out without departing from the principles of the invention which is intended to be limited only by the scope of the appended claims, as interpreted according to the principles of patent law including the doctrine of equivalents.

We claim:

1. A belt turn conveyor comprising:
   a conveyor support having first and second generally stationary vertical bearing surfaces and first and second generally stationary horizontal bearing surfaces;
   an endless belt rotationally supported by said conveyor support, said endless belt having means for engaging said vertical bearing surfaces for retaining said endless belt on said conveyor support; and
   an elongated strip of low friction flexible material secured to said endless belt, said elongated strip engaging said horizontal surfaces to restrain vertical movement of said endless belt.

2. The belt conveyor of claim 1, said conveyor support including a bracket, said vertical and horizontal bearing surfaces being provided on said bracket.

3. The belt conveyor of claim 2, further comprising first and second bearing members secured to said bracket, said first and second bearing members providing said horizontal bearing surfaces.

4. The belt conveyor of claim 2, said conveyor support including a support beam cantilevered from said bracket for supporting said endless belt thereon.

5. The belt conveyor of claim 2, said bracket is T-shaped having upper and lower flange portions and a central web portion.

6. The belt conveyor of claim 5, further comprising a bearing member secured to said central web portion, said bearing member extending above and below said central web portion and providing said vertical bearing surfaces.

7. The belt conveyor of claim 1, wherein said elongated strip of low frictional flexible material comprises a needle point material.

8. The belt conveyor of claim 1, wherein said elongated strip of low frictional flexible material is generally flat.

9. The belt conveyor of claim 1, wherein said means for retaining comprises bearing assemblies.

10. The belt conveyor of claim 9, wherein said vertical bearing surfaces include liners.

11. The belt conveyor of claim 10, wherein liners are releasably secured to said first and second vertical bearing surfaces.

12. The belt conveyor of claim 10, wherein liners are releasably secured to said first and second vertical bearing surfaces by hook and loop fasteners.

13. An endless belt assembly for a belt turn conveyor, said belt turn conveyor including a support frame, a bracket secured to the support frame, a support beam cantilevered from the support frame by the bracket, upper and lower generally horizontal bearing tracks and upper and lower generally vertical bearing tracks being provided on the bracket, said endless belt assembly comprising:
  an endless belt;
  a plurality of spaced bearing assemblies secured to said endless belt, said bearing assemblies including rollers for engaging the generally vertical bearing tracks on the bracket for retaining said endless belt on the support beam; and
  an elongated, generally flat strip of low friction flexible material secured to said endless belt, said elongated strip of low friction flexible material for engaging the upper and lower horizontal bearing tracks on the bracket for restraining the vertical movement of said endless belt.

14. An endless belt assembly according to claim 13, wherein said elongated, generally flat strip of low frictional flexible material comprises a needle point material.

15. An endless belt assembly according to claim 14, wherein said bearing assemblies are secured to extend from an underside of said belt.

16. An endless belt assembly according to claim 13, wherein said elongated, generally flat strip of low frictional flexible material extends along and is secured to an upper surface said belt.

17. An endless belt assembly according to claim 13, wherein said endless belt comprises a conical shaped belt having an inner edge dimension and an outer edge dimension, said inner edge dimension being less than said outer edge dimension.

18. An endless belt assembly according to claim 17, wherein said elongated, generally flat strip of low frictional flexible material extends along said outer edge and is secured to an upper surface said belt.

19. A belt turn conveyor comprising:
  a bracket for securing to a support frame;
  upper and lower generally horizontal bearing tracks and upper and lower generally vertical bearing tracks being provided on said bracket;
  a support beam supported by said bracket;
  an endless belt;
  a plurality of spaced bearing assemblies secured to said endless belt, said bearing assemblies including rollers engaging said generally vertical bearing surfaces on said bracket for retaining said endless belt on the support frame; and
  an elongated, generally flat strip of low friction flexible material secured to said endless belt, said elongated strip engaging said upper and lower horizontal bearing surfaces on said support bracket for restraining vertical movement of said endless belt.

20. A belt turn conveyor according to claim 19, wherein said elongated strip of low frictional flexible material comprises a needle point material.

21. The belt turn conveyor of claim 19, wherein said support beam is cantilevered from said bracket for supporting said endless belt thereon.

22. The belt turn conveyor of claim 21, wherein said bracket is T-shaped having an upper and lower flange portions and a central web portion.

23. The belt conveyor of claim 22, further comprising a plate secured to said central web portion, said plate extending above and below said central web portion and providing said vertical bearing surfaces.

24. The belt conveyor of claim 23, further comprising second and third plates secured to said upper and lower flange portions, respectively, said second and third plates providing said horizontal bearing surfaces.

25. A belt turn conveyor comprising:
  a bracket adapted for securing to a vertical support, said bracket having a central member;
  first and second vertical bearing surfaces and first and second horizontal bearing surfaces being provided on said bracket;
  a belt support surface supported by said bracket;
  an endless belt riding on said support surface, said endless belt having an upper portion riding over said support surface and a lower portion riding under said support surface, said endless belt having a longitudinal proximate edge portion; and
  a plurality of bearing devices mounted to proximate edge portion of said endless belt, a first set of bearing devices positioned to engage said first and second vertical bearing surfaces for restraining lateral movement of said endless belt, at least one of said plurality of bearing devices comprising an elongated strip of low friction flexible material secured to said proximate edge portion of said endless belt to engage said first and second horizontal bearing members for restraining vertical movement of said endless belt.

26. The belt turn conveyor in claim 25, wherein said first set of said bearing devices comprise wheel assemblies.

27. The belt turn conveyor in claim 26, further including a plate member secured to said central member of said bracket, said plate member providing said first and second vertical bearing surfaces and including replaceable liners secured thereon.

28. The belt turn conveyor in claim 25, wherein said elongated strip of low friction flexible material is generally flat and is secured to a top surface of said endless belt.

29. The belt turn conveyor in claim 28, wherein said elongated strip of low friction flexible material comprises a needlepoint material.

30. The belt turn conveyor in claim 28, wherein portions of said elongated strip of low friction flexible material is sandwiched between said first horizontal bearing surface and said endless belt and between said second horizontal bearing surface and said endless belt.

31. The belt turn conveyor in claim 25, wherein bracket comprises a T-shaped bracket having a web portion and a flange portion, said flange portion being adapted for securing to the vertical support.

32. The belt turn conveyor in claim 25, including a motor assembly and an elongated drive pulley, said motor assembly coupled to said pulley to drive said pulley to rotate about a first axis to frictionally engage said endless belt in order to drive said belt.

33. The belt turn conveyor in claim 32, wherein said drive pulley is tapered and said first axis is inclined.

34. A belt turn conveyor comprising:
a T-shaped bracket mountable to a rigid vertical support;
upper and lower generally vertically oriented bearing surfaces and upper and lower generally horizontally oriented bearing surfaces provided on said T-shaped bracket;
a support beam supported from said bracket;
an endless belt riding on said support beam, said endless belt having an upper portion riding over said support beam and a lower portion riding under said support beam, said endless belt having a proximate edge portion;
a plurality of bearing assemblies mounted to said proximate edge portion of said endless belt engaging said upper and lower generally vertical bearing surfaces for resisting lateral movement of said endless belt; and
at least one bearing device mounted to proximate edge portion of said endless belt engaging said upper and lower generally horizontal bearing surfaces for resisting vertical movement of said endless belt.

35. The belt turn conveyor in claim 34, wherein said bearing assemblies and said bearing device comprise wheels.

36. The belt turn conveyor in claim 34, wherein said T-shaped bracket includes a flange and a central web, said flange mountable to the rigid vertical support.

37. The belt turn conveyor in claim 36, wherein said upper and lower generally vertical bearing surfaces are provided by a first plate secured to a distal end portion of said central web, said first plate including portions extending above and below said central web to provide said upper and lower generally vertical bearing surfaces.

38. The belt turn conveyor in claim 37, further comprising second and third plates secured to said T-shaped bracket, said second plate secured to an upper end of said flange and said third plate secured to a lower end of said flange, said second plate extending from said flange to provide said upper generally horizontal bearing surface, and said third plate extending from said flange provide said lower generally horizontal bearing surface.

39. The belt turn conveyor in claim 38, wherein said at least one bearing device comprises an elongated strip of low friction flexible material secured to a proximate edge portion of said endless belt for engaging said upper and lower generally horizontal bearing surfaces.

40. The belt turn conveyor in claim 39, wherein said elongated strip of low friction flexible material comprises a needle point fabric.

41. The belt turn conveyor in claim 38, wherein said upper and lower generally vertical bearing surfaces include liners.

42. The belt turn conveyor in claim 41, wherein said liners are releasably secured to said first member by hook and loop fasteners.

43. A belt turn conveyor including a conveyor support, said conveyor turn conveyor comprising:
a T-shaped bracket having a flange and a web, said flange for securing to the conveyor support;
a first member supported by said T-shaped bracket, said first member including a first and second bearing surfaces;
a second member supported by said T-shaped bracket, said second member including a third bearing surface;
a support beam supported by said T-shaped bracket;
an endless belt riding on said support beam, said endless belt having a proximate edge portion; and
a plurality of bearing assemblies mounted to said endless belt on said proximate edge portion, a first set of said plurality of bearing assemblies bearing on said first and second bearing surfaces of said first member for resisting lateral movement of said endless belt, a second set of said plurality of bearing assemblies bearing on said third bearing surface of said second member for resisting vertical movement of said endless belt.

44. The belt turn conveyor in claim 43, wherein said bearing assemblies comprise wheels.

45. The belt turn conveyor in claim 44, said endless belt having an upper portion riding over a top surface of said support beam and a bottom portion riding over a bottom surface of said support beam, wherein said support beam includes a planar surface supporting said upper portion of said belt.

46. The belt turn conveyor in claim 44, wherein one of said bearing surfaces includes a replaceable liner.

47. The belt turn conveyor in claim 46, wherein said replaceable liner is releasably secured to said one of said bearing surfaces by hook and loop fasteners.

48. The belt turn conveyor in claim 46, wherein each wheel includes a polymeric tire.

49. The belt turn conveyor in claim 48, wherein said liner includes a metal wheel bearing surface.

50. The belt turn conveyor in claim 45, wherein said support beam includes a plurality of spaced elongated members, said plurality of elongated members spaced below said planar member and fixed to said planar member to form a truss.

51. The belt turn conveyor in claim 43, wherein said web of said T-shaped bracket includes a distal end portion, said first member secured to said distal end portion of said web.

52. The belt turn conveyor in claim 51, wherein said first and second members comprise plates.

* * * * *